US012636618B1

(12) United States Patent
Singh et al.

(10) Patent No.: US 12,636,618 B1
(45) Date of Patent: May 26, 2026

(54) ASYMMETRIC CARBON MOLECULAR SIEVE HOLLOW FIBER MEMBRANES

(71) Applicant: Triad National Security, LLC, Los Alamos, NM (US)

(72) Inventors: Rajinder Pal Singh, Los Alamos, NM (US); JongGeun Seong, Los Alamos, NM (US); Jeremy Charles Lewis, Los Alamos, NM (US); Kathryn A. Berchtold, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 590 days.

(21) Appl. No.: 18/170,722

(22) Filed: Feb. 17, 2023

(51) Int. Cl.

| | |
|---|---|
| ***B01D 53/22*** | (2006.01) |
| ***B01D 67/00*** | (2006.01) |
| ***B01D 69/08*** | (2006.01) |
| ***B01D 71/02*** | (2006.01) |
| ***C01B 3/503*** | (2026.01) |
| ***C02F 1/44*** | (2023.01) |
| *C02F 101/30* | (2006.01) |

(52) U.S. Cl.
CPC ....... *B01D 67/0067* (2013.01); *B01D 53/228* (2013.01); *B01D 69/08* (2013.01); *B01D 71/021* (2013.01); *C01B 3/503* (2013.01); *C02F 1/44* (2013.01); *B01D 2053/224* (2013.01); *C01B 2203/041* (2013.01); *C02F 2101/30* (2013.01)

(58) Field of Classification Search
CPC .. B01D 67/0067; B01D 53/228; B01D 69/08; B01D 71/021; B01D 2053/224; C01B 3/503; C01B 2203/041; C02F 1/44; C02F 2101/30
See application file for complete search history.

(56) References Cited

U.S. PATENT DOCUMENTS

| | | | | |
|---|---|---|---|---|
| 2,895,948 | A | 7/1959 | Brinker et al. | |
| RE26,065 | E | 7/1966 | Marvel et al. | |
| 3,737,042 | A | 6/1973 | Boom | |
| 4,506,068 | A | 3/1985 | Choe et al. | |
| 4,814,530 | A | 3/1989 | Ward et al. | |
| 4,933,083 | A * | 6/1990 | Jones, Jr. | B01D 71/62 210/500.39 |
| 5,264,542 | A * | 11/1993 | Hughes | C08G 73/18 528/331 |
| 8,911,534 | B2 * | 12/2014 | Koros | B01D 71/021 96/10 |
| 9,211,504 | B2 | 12/2015 | Bhuwania et al. | |
| 9,815,030 | B2 | 11/2017 | Bhuwania et al. | |
| 10,456,747 | B2 | 10/2019 | McCool et al. | |

(Continued)

OTHER PUBLICATIONS

Vogel et al., "Polybenzimidazoles, New Thermally Stable Polymers", Journal of Polymer Science, vol. 50, Issue 154, Apr. 1961, pp. 511-539.

*Primary Examiner* — Anthony Shumate
(74) *Attorney, Agent, or Firm* — Alston & Bird LLP

(57) ABSTRACT

Provided are methods of preparing carbon molecular sieve (CMS) hollow fiber membranes derived from polybenzimidazole (PBI) hollow fiber membranes, obtained by contacting a PBI hollow fiber membrane with a cross-linking or acid solution prior to carbonization. CMS hollow fiber membranes obtained by these methods, and methods of using said CMS hollow fiber membranes for fluid separation and purification, are also provided.

5 Claims, 5 Drawing Sheets

(56) References Cited

U.S. PATENT DOCUMENTS

| | | | | |
|---|---|---|---|---|
| 2002/0053284 | A1* | 5/2002 | Koros | B01D 69/08<br>96/10 |
| 2004/0261616 | A1* | 12/2004 | Jorgensen | B01D 71/62<br>96/14 |
| 2007/0151926 | A1 | 7/2007 | Calundann et al. | |
| 2011/0100211 | A1* | 5/2011 | Kiyono | B01D 71/021<br>95/45 |
| 2012/0247327 | A1* | 10/2012 | Omole | B01D 61/246<br>95/51 |
| 2013/0118983 | A1* | 5/2013 | Livingston | B01D 69/02<br>210/500.33 |
| 2013/0152793 | A1* | 6/2013 | Bhuwania | B01D 67/0067<br>423/447.4 |
| 2014/0000454 | A1* | 1/2014 | Singh | C01B 32/05<br>96/10 |
| 2015/0217238 | A1* | 8/2015 | Tang | B01D 69/1251<br>210/483 |
| 2016/0184775 | A1* | 6/2016 | Chevrel | B01D 53/228 |
| 2016/0346740 | A1* | 12/2016 | Koros | B01D 53/228 |
| 2016/0375410 | A1* | 12/2016 | Berchtold | B01D 53/228<br>95/55 |
| 2017/0173539 | A1* | 6/2017 | Tsapatsis | B01J 29/70 |
| 2017/0189859 | A1* | 7/2017 | Chen | B01J 20/20 |
| 2018/0229181 | A1* | 8/2018 | Zhang | B01D 69/08 |
| 2019/0118133 | A1* | 4/2019 | Chu | B01D 69/145 |
| 2019/0176092 | A1* | 6/2019 | Livingston | B01D 71/62 |
| 2022/0219125 | A1* | 7/2022 | Pinnau | B01D 71/024 |
| 2023/0024915 | A1* | 1/2023 | Hopkinson | B01D 69/12 |
| 2024/0243321 | A1* | 7/2024 | Lotemo | H01M 8/103 |
| 2024/0342664 | A1* | 10/2024 | Zhang | B01D 69/02 |

* cited by examiner

| | | | | | | |
|---|---|---|---|---|---|---|
| A | 0 | 0 | 0 | 850 | 28 | 8.63 |
| B | 5 | 0.025 | 200 | 650 | 487 | 93.30 |
| C | 5 | 0.25 | 20 | 650 | 935 | 102.75 |
| D | 5 | 1 | 5 | 850 | 876 | 73.01 |
| E | 5 | 1.25 | 4 | 850 | 848 | 52.55 |
| F | 5 | 1.5 | 3.3 | 650 | 1128 | 35.86 |
| G | 5 | 2.5 | 2 | 650 | 1568 | 10.00 |
| H | 5 | 2.5 | 2 | 850 | 1865 | 18.03 |

| [illegible] | [illegible] | [illegible] | [illegible] | [illegible] | [illegible] |
|---|---|---|---|---|---|
| 0 | 0 | 0 | 0 | 0 | 850 |
| A1 | 0.05 | 5 | 2.5 | 2 | 850 |
| A2 | 0.5 | 5 | 2.5 | 2 | 850 |
| A3 | 1 | 5 | 2.5 | 2 | 850 |
| A4 | 5 | 5 | 2.5 | 2 | 850 |
| A5 | 10 | 5 | 2.5 | 2 | 850 |

ASYMMETRIC CARBON MOLECULAR SIEVE HOLLOW FIBER MEMBRANES

FIELD

The present invention relates generally to asymmetric carbon molecular sieve hollow fiber membranes, and methods of preparing the same.

BACKGROUND

Advanced gas, vapor and liquid separation technologies enable higher separation efficiency (high product purity & recovery) and significant cost savings (capital and operating) for clean power, fuels and chemicals processes. Large-scale hydrocarbon fuel (e.g. coal, biomass, natural gas) based $H_2$ and power production processes with integrated carbon capture requires efficient method for $H_2/CO_2$ separation applicable at process relevant operating and environmental conditions. The synthesis gas produced from coal & biomass gasification, and steam methane reforming of natural gas consists of primarily $H_2$, $CO_2$, and CO (& trace impurities) after water gas shift (WGS) reaction. The temperature of gas exiting a WGS reactor is typically at 240° C. Industry standard sorbent- and solvent-based $H_2$ and $CO_2$ separation methods operate at low temperature (near ambient), and produce $CO_2$ at low pressure, resulting in a large penalty for the carbon capture and sequestration.

Membrane based processes have advantages over industry standard gas separation process due to small foot-print, better energy efficiency, modularity, and operation flexibility. Carbon molecular sieve (CMS) materials derived from polymeric materials have been shown to have high $H_2/CO_2$ separation performance at elevated temperatures (ca. 250° C.). However, processing of large volume industrial stream typical of $H_2$ and power production processes mandates development of the polymer derived materials into high surface area industrial deployable hollow fiber platform. Ideally, a polymer hollow fiber membrane having an asymmetric morphology (i.e., a thin selective layer supported by an interconnected porous support layer) upon high temperature carbonization process should lead to asymmetric CMS hollow fiber membranes. However, high temperature carbonization of polymer hollow fiber membranes leads to collapse of asymmetric morphology, resulting in thick selective layers.

Several post-treatment methods including crosslinking and impregnation of inorganic materials (e.g. sol-gel stabilization and silica particle stabilization) have been reported to mitigate asymmetric morphology collapse (loss of meso- and microporosity) in the polymer derived CMS hollow fiber membranes. Nonetheless, these pre-fabrication steps for preparing porous materials are still challenging in process complexity, including multistep post-spinning fiber treatment e.g. dehydroflourination and subsequent nucleophilic addition and long post-crosslinking time (at least as long as 30 hours) as in the case of poly(vinylidene fluoride) hollow fiber membranes, or needing to use a multi-nozzle for spinning composite precursor fibers. Further, these methods cannot in situ tailor pore size distributions in a gas selective layer at the interface of porous support layer and surface selective layer.

Accordingly, there still exists a need for improved methods of preparing CMS hollow fiber membranes with porous support layers which retain their morphology following high temperature carbonization, and membranes made by such methods.

BRIEF SUMMARY OF INVENTION

Embodiments of the invention are directed to a method of preparing a polybenzimidazole-derived carbon molecular sieve (CMS) hollow fiber membrane, said method comprising:

i) providing an asymmetric polybenzimidazole (PBI) hollow fiber membrane, said asymmetric PBI hollow fiber membrane comprising
  a) a porous support structure devoid of macrovoids;
  b) an integral porous selective layer in intimate contact with the porous support structure; and
  c) a lumen defined by the porous support structure,
ii) contacting said asymmetric PBI hollow fiber membrane with
  a) an aqueous solution comprising a crosslinking agent, thereby forming a cross-linked asymmetric PBI hollow fiber membrane, or
  b) an aqueous solution comprising an acid, thereby forming an acid-doped asymmetric PBI hollow fiber membrane; and
iii) pyrolyzing the cross-linked asymmetric PBI hollow fiber membrane or acid-doped asymmetric PBI hollow fiber membrane, thereby producing a PBI-derived CMS hollow fiber membrane.

Another embodiment is a PBI-derived CMS hollow fiber membrane made by the above method.

Another embodiment is a PBI-derived, pyrolyzed CMS hollow fiber membrane comprising:

a) a crosslinked or acid-doped polybenzimidazole (PBI)-derived porous support structure devoid of macrovoids;
b) an integral PBI-derived porous selective layer in intimate contact with the porous support structure; and
c) a lumen defined by the porous support structure;

wherein the PBI from which each of the porous support structure and the porous selective layer are derived is the same PBI.

Another embodiment is a method for separating gases from a gas stream comprising:

i) contacting a first side of a PBI-derived CMS hollow fiber membrane as described above with a gas stream comprising two or more gases or vapors;
ii) providing a pressure or concentration gradient across the PBI-derived CMS hollow fiber membrane, so as to cause a portion of the gas stream to pass through the membrane; and
iii) collecting a permeate stream at a second side of the membrane and a retentate stream at said first side of the membrane.

Another embodiment is a method for separating water and an organic liquid, comprising:

i) contacting a first side of a PBI-derived CMS hollow fiber membrane as described above with a mixture comprising an organic liquid and water;
ii) providing a pressure or concentration gradient across the PBI-derived CMS hollow fiber membrane, so as to cause a portion of the mixture to pass through the membrane; and
iii) collecting a permeate from the second side of the PBI-derived CMS hollow fiber membrane and collecting a retentate from the first side of the PBI-derived CMS hollow fiber membrane.

Another embodiment is a method for separating impurities and/or dissolved material from water, comprising:

i) contacting a first side of a PBI-derived CMS hollow fiber membrane as described above with a solution comprising water and impurities;

ii) providing a pressure or concentration gradient across the PBI-derived CMS hollow fiber membrane, so as to cause a portion of the solution to pass through the membrane; and iii) collecting a permeate from the second side of the PBI-derived CMS hollow fiber membrane and collecting a retentate comprising the impurities and/or dissolved material from the first side of the PBI-derived CMS hollow fiber membrane.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
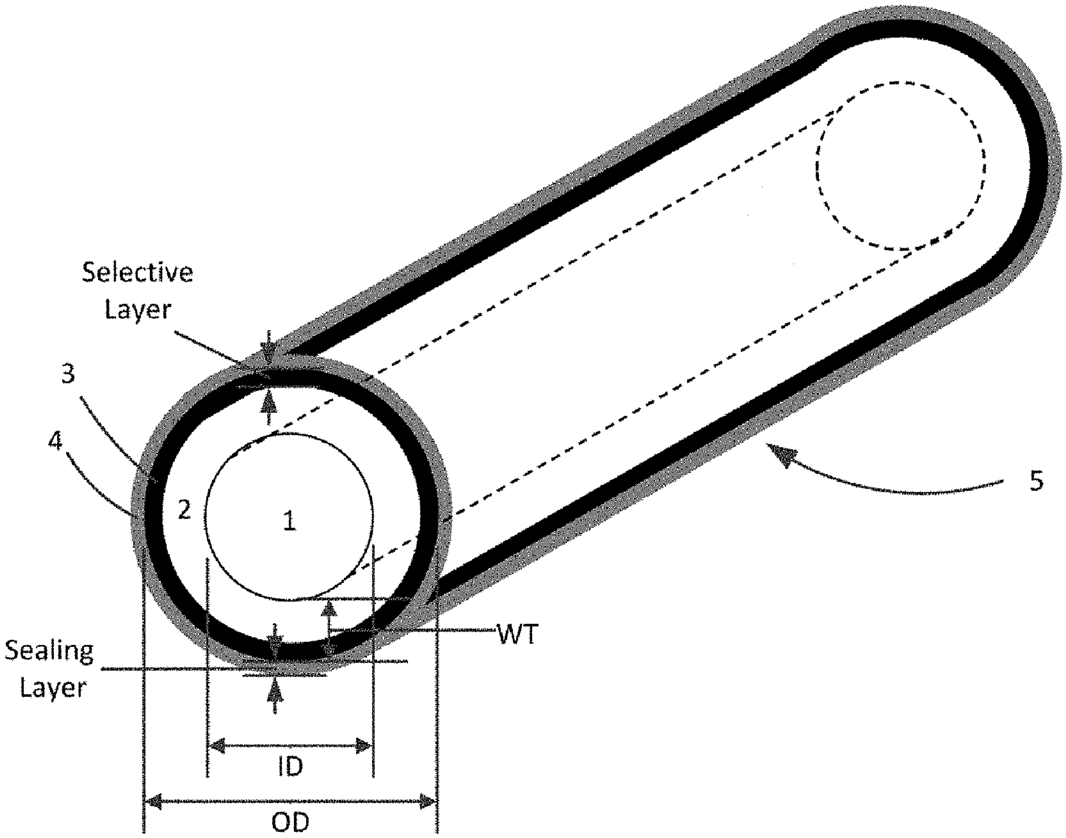
FIG. 1 shows a schematic representation of a hollow fiber.

Various embodiments now will be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout.

In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

All patents, patent publications, and references cited herein are incorporated herein by reference in their entireties.

It is understood that where a parameter range is provided, all integers and ranges within that range, and tenths and hundredths thereof, are also provided by the embodiments. For example, "5-10" includes 5, 6, 7, 8, 9, and 10; 5.0, 5.1, 5.2 . . . 9.8, 9.9, and 10.0; and 5.00, 5.01, 5.02 . . . 9.98, 9.99, and 10.00, as well as, for example, 6-9, 5.1-9.9, and 5.01-9.99. It is also understood that when a list is written in a format such as "at least 1, 2, 3 . . . " or the like, this is equivalent to "at least 1, at least 2, at least 3 . . . " and so on.

Definitions

For the purposes of the present application, the following terms shall have the following meanings:

As used herein, "air gap" means a region of air between a distal end of a spinneret and the surface of a coagulation bath.

As used herein, "asymmetric membrane" means a membrane structure comprising two or more layers, including a thin dense or porous skin supported by a thick, porous substructure in which one or more layers are formed from a polymer dope by a phase inversion process. One or more layers can also be deposited using standard thin film deposition techniques after fiber formation with phase inversion process. This also refers to an integrally-skinned membrane.

As used herein, the term "defect" refers to a pore or opening in a material or matrix or layer which allows non-selective transport of two or more species of the fluid stream in contact with the material or matrix or layer. "Nearly defect-free" as used herein means the absence of these non-selective pores to the degree that selective transport of two or more species of the fluid in contact with the membrane is achieved, e.g., at least 95% free of non-selective pores.

As used herein, "dense" describes a material or matrix or layer that has no mesopores, macropores, and/or macrovoids. According to IUPAC notation, mesopores have diameters between 2 and 50 nm, and macropores have diameters larger than 50 nm. As used herein, the term "micropore" refers to small pores with diameters less than 2 nm but greater than 0.4 nm. Thus, a dense material, matrix, or layer has no pores or voids with a diameter greater than 0.4 nm.

As used herein, "dope" refers to a solution comprising a polymer dissolved in a solvent or a solvent/non-solvent mixture.

As used herein, "dope stabilizing agent" refers to an agent that stabilizes a polymer solution in one or more solvents and/or a combination of one or more solvents and one or more non-solvents, and facilitates maintenance of a solubilized state.

As used herein, "feed stream" refers to a gas stream prior to separation via a membrane. The feed stream contacts the membrane, and a portion of the feed stream goes through the membrane (the "permeate stream") and a portion does not (the "retentate stream").

Gas permeance is a measure of how much gas is flowing across a membrane per unit of pressure differential. The term "gas permeation unit (GPU)" as used herein refers to permeability divided by the thickness of the selective layer. 1 GPU=$3.3\times10^{-10}$ mol/($m^2$-s-Pa)=$10^{-6}$ $cm^3$STP/($cm^2$-cmHg).

As used herein, "inherent viscosity" refers to the ratio of the natural logarithm of the relative viscosity to the mass concentration (g/dL) of the polymer, where relative viscosity is the viscosity of the solution divided by the viscosity of the neat solvent. Inherent viscosity is expressed in units of dL/g.

As used herein, "macrovoid" refers to a larger-diameter void formed within the porous substructure of a membrane. As used herein, the term macrovoid refers to a void having a volume and/or cross-sectional area that is at least 5-10× larger than an average pore volume and/or cross-sectional area of the porous substructure. A macrovoid may have a diameter, in the largest dimension, of at least 5 μm, such as 5-100 μm.

As used herein, a "monoprotic acid" is an acid that is able to donate one hydrogen atom to its aqueous solution. A "polyprotic acid" is an acid that is able to donate two or more hydrogen atoms to its aqueous solution.

As used herein, the term "non-solvent" refers to a liquid that, at processing temperatures, dissolves no more than trace amounts of a given polybenzimidazole polymer when used alone.

As used herein, "permeability" is a material property that describes the rate at which a fluid (liquid and/or gas) traverses through a material, normalized by its thickness and the pressure driving force (typical unit=barrer; 1 barrer=1× $10^{-10}$ $cm^3$-cm/(s-$cm^2$-cmHg)).

As used herein, "permeate" refers to a fraction of a fluid (liquid and/or gas) that passes through a membrane. The "permeate stream" is the portion of a feed stream that passes through a membrane, when the membrane is used to separate the feed stream.

As used herein, "permselectivity" is used to define the preferential permeation of certain species through a membrane and calculated as ratio of permeabilities or permeances of two species through a membrane As used herein, "a phosphoric acid" refers to any phosphorus oxoacid in which each phosphorus atom is in the oxidation state +5, and is bonded to four oxygen atoms, one of them through a double bond, arranged as the corners of a tetrahedron. Non-limiting examples of phosphoric acids include phosphoric acid (also known as orthophosphoric acid) ($H_3PO_4$); pyrophosphoric acid ($H_4P_2O_7$); tripolyphosphoric acid ($H_5P_3O_{10}$); tetrapolyphosphoric acid ($H_6P_4O_{13}$); trimetaphosphoric acid ($H_3P_3O_9$), and phosphoric anhydride ($P_4O_{10}$).

As used herein, a "sulfuric oxoacid" is an acid comprising sulfur, oxygen, and hydrogen. Non-limiting examples of sulfuric oxoacids include sulfuric acid ($H_2SO_4$), disulfuric acid ($H_2SO_4SO_3$), peroxymonosulfuric acid ($H_2SO_5$), peroxydisulfuric acid ($H_2S_2O_2$), dithionic acid ($H_2S_2O_6$), thiosulfuric acid ($H_2S_2O_3$), disulfurous acid ($H_2S_2O_5$), sulfurous acid ($H_2SO_3$), dithionous acid ($H_2S_2O_4$), sulfoxylic acid ($H_2SO_2$), polythionic acid ($H_2S_xO_2$, wherein x is from 1-14), thiosulfurous acid ($H_2S_2O_2$), and dihydroxydisulfane ($H_2S_2O_2$).

As used herein, "pore" means one of many openings or void spaces in a solid substance of any kind. Pores are characterized by their diameters. As used herein, the term "micropore" refers to small pores with diameters less than 2 nm. Porosity is a measure of the void spaces or openings in a material, and is measured as a fraction, between 0-1, or as a percentage between 0-100%.

As used herein, "porous" is used to describe a matrix or material that is permeable to fluids (such as liquids or gases). For example, a porous matrix is a matrix that is permeated by a network of pores (voids) that may be filled with a fluid. In some examples, both the matrix and the pore network (also known as the pore space) are continuous, so as to form two interpenetrating continua.

As used herein, "retentate" refers to a fraction of a fluid (liquid and/or gas) retained by a membrane. The "retentate stream" is the portion of a feed stream that does not pass through a membrane, when the membrane is used to separate the feed stream.

As used herein, "selective layer" means a layer on the membrane which allows selective transport of one or more species as compared to other species present in the fluid stream in contact with the membrane.

As used herein, the term "solvent" refers to a liquid in which a given polybenzimidazole polymer is soluble.

As used herein, "solute" means the minor component in a solution, dissolved in the solvent.

As used herein, "synthesis gas (syngas)" means a fuel gas mixture comprising primarily hydrogen, carbon monoxide, and carbon dioxide. Syngas may further include steam, hydrocarbons, nitrogen, hydrogen sulfide, carbonyl sulfide, ammonia, oxygen, trace metals, or any combination thereof.

The terms "about" and "substantially" as used herein means a deviation (plus/minus) of less than 10%, and in particular, less than 5%, less than 4%, less than 3%, and less than 2% of the recited value.

Polybenzimidazole Hollow Fibers and Membranes

Polybenzimidazole (PBI) as used herein refers to PBI, blends of PBI with other polymers, copolymers of PBI, and combinations thereof. Typical polymers of this class and their preparation are described, for example, in U.S. Pat. Nos. 3,737,042, 2,895,948 and R.E. 26,065, and *Journal of Polymer Science*, L, (1961) 511-539. The PBI polymers comprise recurring units of Formula 1, Formula 2, or a combination thereof.

Formula 1 is:

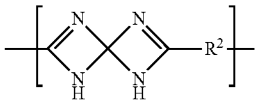

wherein $R^1$ is a tetravalent aromatic moiety with the nitrogen atoms, together with adjacent carbon atoms of $R^1$ (i.e. ortho carbon atoms of the aromatic moiety), forming a benzimidazole ring, and $R^2$ is (1) an aromatic ring, (2) an alkylene group, or (3) a heterocyclic ring selected from the group consisting of a) pyridine, b) pyrazine, c) furan, d) quinolone, and e) thiophene.

Formula 2 is:

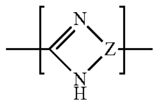

wherein Z is an aromatic moiety having the nitrogen atoms forming the benzimidazole ring paired with adjacent carbon atoms of the aromatic moiety.

Exemplary $R^1$ groups include, but are not limited to, phenyl, diphenyl, diphenylsulfone, diphenylether, diphenyl hexafluoropropane, naphthalene,

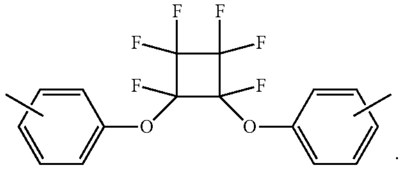

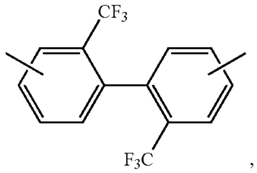

, and

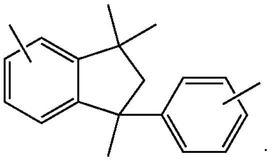

Exemplary $R^2$ and Z groups include, but are not limited to, the foregoing groups and cyclohexene. A person of ordinary skill in the art of organic chemistry understands that, in the foregoing structures, the bonds connecting $R^1$ and $R^2$ to the benzimidazole rings may be in any position on the illustrated rings. For example,

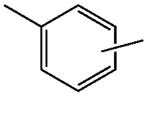

represents

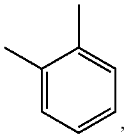

,

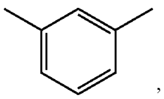

, or

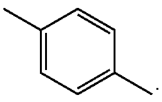

Exemplary PBI polymers according to Formula 1 or Formula 2 include:

a)

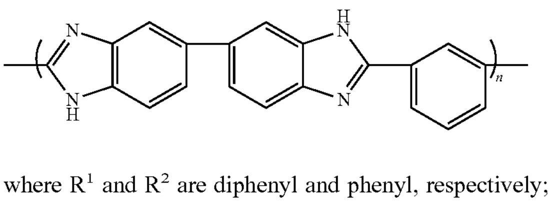

where $R^1$ and $R^2$ are diphenyl and phenyl, respectively;

b)

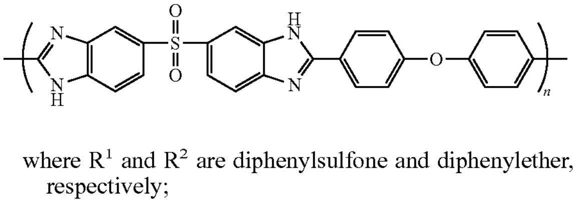

where $R^1$ and $R^2$ are diphenylsulfone and diphenylether, respectively;

c)

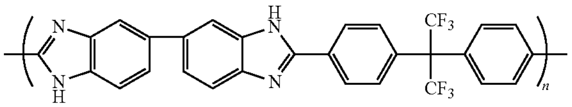

where $R^1$ and $R^2$ are diphenyl and diphenyl-hexafluoropropane, respectively;

d)

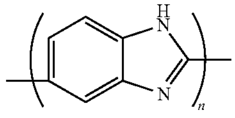

where Z is phenyl.

In each of the foregoing formulas, n is any integer >0. In an embodiment, n is 1-100,000.

PBI can also be considered to be the product of the melt or solution polymerization of a tetra-amine (e.g., aromatic and heteroaromatic tetra-amino compounds) and a second monomer being selected from the group consisting of free dicarboxylic acids, alkyl and/or aromatic esters of dicarboxylic acids, alkyl and/or aromatic esters of aromatic or heterocyclic dicarboxylic acid, and/or alkyl and/or aromatic anhydrides of aromatic or heterocyclic dicarboxylic acid. Further details may be obtained from U.S. Pat. Nos. RE 26,065; 4,506,068; 4,814,530; and US Publication No. 2007/0151926, each of which is incorporated herein by reference. In an embodiment, the PBI comprises more than one kind of PBI molecule.

Embodiments of the disclosed PBI hollow fibers have an integral thin selective layer and a porous underlying support structure. The selective layer is in intimate contact with the porous support structure, and typically is present on only one surface of the porous support structure. The selective layer can be dense or porous with a highly porous interconnected support structure comprising the remainder of the fiber wall. "Interconnected" as used herein means that not all pores are discrete, and the open space within a pore may contact the open space within one or more adjacent pores. The PBI asymmetric hollow fiber membrane with a dense selective layer exhibits excellent gas separation performance with a high degree of chemical stability and mechanical robustness. The present disclosure provides a new type of asymmetric hollow fiber membranes, and the application of such membranes for gas separations and solute molecules removal from organic solvents and water.

A hollow fiber membrane, as used herein, refers to a thin selective multilayered hollow fiber having at least two layers. The hollow fiber may have one or more thin selective dense or porous layers. In one embodiment, the hollow fiber membrane is characterized as an asymmetric membrane. In FIG. 1, there is shown a dual thin-layered hollow fiber membrane 5, with an optional defect-sealing layer 4, a dense or porous integrated selective layer 3 (facing outward), and a porous support structure 2. The thicknesses of the defect-sealing layer 4 and the integrated selective layer 3 are significantly thinner in comparison to the porous underlying support 2. The polymers of the sealing layer 4 and the integrated selective layer 3 may knit (or blend) together thereby forming a bond. A lumen 1 is formed within the hollow fiber membrane 5. The hollow fiber membrane has an outside diameter (OD), an inside diameter (ID) and wall thickness (WT). PBI hollow fibers consisting of defect-sealing layer 4 or dense integrated selective layer 3 or both, and porous support structure 2 are highly suitable for gas, vapor and liquid separation, dehydration of organic liquids, small molecular weight solute (up to 1000 Da) removal from organic liquid and water applications, while hollow fibers with only the integrated porous selective layer 3 and the porous structure 2 are highly suitable for large molecular weight solute (>1000 Da) and suspended particles removal from organic liquid and water.

In one embodiment the OD of the hollow fiber 5 is in the range of 50 to 3000 microns (μm), such as from 50 to 500 μm. In one embodiment, the porous support structure 2 has a highly interconnected porous structure with a thickness in the range of 10 to 1500 μm. In an embodiment, the thickness is 10, 20, 30, 40, 50, 60, 70, 80, 90, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475, or 1500 μm, or a range between any two of these values.

In one embodiment the dense integrated selective layer 3 thickness is greater than 0.01 μm. In an embodiment, the dense integrated selective layer 3 thickness is in the range of 0.01 to 250 μm, such as 0.01 to 10 μm or 0.1 to 0.25 μm. In one embodiment the dense sealing layer 4 thickness is in the range of 0.1 to 5 μm, such as 0.25 to 1 μm).

Methods of Making PBI Hollow Fiber Membranes

A process of making PBI hollow fiber membranes may generally comprise: (1) preparing a polymer dope comprising (i) a polybenzimidazole (PBI) polymer, (ii) a dope stabilizing agent, and (iii) a mixture of a primary solvent A and a secondary solvent/non-solvent B; (2) preparing a bore fluid comprising a mixture of a solvent/non-solvent C and/or a solvent/non-solvent D; (3) extruding the PBI dope and bore fluid simultaneously through a spinneret consisting of a central bore tube and a concentric annular channel (i.e., a tube-in-orifice spinneret); (4) optionally passing the nascent hollow fiber through an air gap defined between the spinneret and coagulation bath; and (5) immersing the nascent hollow fiber into a coagulation bath comprising a solvent/non-solvent E and/or solvent/non-solvent F. The hollow fiber may then be taken up on a drum. Optionally, the process further includes a step of supercritical drying or sequential solvent exchange of imbibed coagulant or residual dope solvent in PBI hollow fiber with acetone or methanol or ethanol or isopropanol and then with hexane prior to drying, which prevents structure destruction due to capillary forces. The process then comprises a crosslinking step, followed by a high-temperature carbonization step (also known as pyrolysis), in order to produce an asymmetric CMS hollow fiber membrane.

The additional polymer(s) incorporated into the polymer dope may be any polymer known in the art to be suitable for producing CMS membranes. Non-limiting examples of such polymers include cellulose acetate, polyamide, polyimide, polyetherimide, polybenzoxazole, and polyvinylpyrrolidone.

In some embodiments, the aromatic and heteroaromatic tetra-amino compounds, used in accordance with the disclosed embodiments, are 3,3',4,4'-tetra-aminobiphenyl, 2,3,5,6-tetra-aminopyridine, 1,2,4,5-tetra-aminobenzene, 3,3',4,4'-tetra-aminodiphenylsulfone, 3,3',4,4'-tetra-aminodiphenyl ether, 3,3',4,4'-tetra-aminobenzophenone, 3,3',4,4'-tetra-aminodiphenyl methane, and 3,3',4,4'-tetra-aminodiphenyldimethylmethane, and their salts, in particular, their mono-, di-, tri-, and tetrahydrochloride derivatives.

The aromatic carboxylic acids used, in accordance with the disclosed embodiments, are dicarboxylic acids or its esters, or its anhydrides or its acid chlorides. The term "aromatic carboxylic acids" equally comprises heteroaromatic carboxylic acids as well. In some embodiments, the aromatic dicarboxylic acids are isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-napthalenedicarboxylic acid, diphenic acid, 1,8-dihydroxynaphthalene-3,6-dicarboyxlic acid, diphenyl ether-4,4'-dicarboxylic acid, benzophenone-4,4'-dicarboxylic acid, diphenylsulfone-4,4'-dicarboyxlic acid, biphenyl-4,4'-dicarboxylic acid, 4-trifluoromethylphthalic acid, 2,2-bis(4-carboxyphenyl)hexafluoropropane, 4,4'-((1,2,3,3,4,4-Hexafluorocyclo-butane-1,2-diyl)bis(oxy))dibenzoic acid, 4,4'-stilbenedicarboxylic acid, 4-carboxycinnamic acid, or their C1-C20-alkyl esters or C5-C12-aryl esters, or their acid anhydrides or their acid chlorides.

The heteroaromatic carboxylic acids used, in accordance with the disclosed embodiments, are heteroaromatic dicarboxylic acids or their esters or their anhydrides. The "heteroaromatic dicarboxylic acids" include aromatic systems that contain at least one nitrogen, oxygen, sulfur, or phosphorus atom in the ring. In some embodiments, it is pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridine dicarboxylic acid, 3,5-pyrazole dicarboxylic acid, 2,6-pyrimidine dicarboxylic acid, 2,5-pyrazine dicarboxylic acid, 2,4,6-pyridine tricarboxylic acid, and benzimidazole-5,6-dicarboxylic acid, as well as their C1-C20-alkyl esters or C5-C12-aryl esters, or their acid anhydrides or their acid chlorides. In certain embodiments the aromatic and heteroaromatic diaminocarboxylic acid used in accordance with the disclosed embodiments is diaminobenzoic acid and its mono- and dihydrochloride derivatives.

In some embodiments, mixtures of at least 2 different aromatic carboxylic acids are used. These mixtures are, in particular, mixtures of N-heteroaromatic dicarboxylic acids and/or aromatic dicarboxylic acids or their esters. Non-limiting examples are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynapthalene-3,6-dicarboxylic acid, diphenyl ether-4,4'-dicarboxylic acid, benzophenone-4,4'-dicarboxylic acid, diphenylsulfone-4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidine dicarboxylic acid, and 2,5-pyrazine dicarboxylic acid. In certain embodiments, it is the diphenyl isophthalate (DPW) and its ester. The PBI may have an inherent viscosity (IV) in the range of 0.25 to 3.0 dL/g, such an IV within the range of 0.4 to 3.0 dL/g.

Examples of polybenzimidazoles which may be prepared according to the process as described above include:

poly-2,2'-(m-phenylene)-5,5'-bibenzimidazole;

poly-2,2'-(biphenylene-2"2'")-5,5'-bibenzimidazole;

poly-2,2'-(biphenylene-4"4'")-5,5'-bibenzimidazole;

poly-2,2'-(1",1",3"trimethylindanylene)-3"5"-p-phenylene-5,5'-bibenzimidazole;

2,2'-(m-phenylene)-5,5'-bibenzimidazole/2,2-(1",1",3"-trimethylindanylene)-5",3"-(p-phenylene)-5,5'-bibenzimidazole copolymer;

2,2'-(m-phenylene)-5,5-bibenzimidazole-2,2'-biphenylene-2",2"-5,5'-bibenzimidazole copolymer;

poly-2,2'-(furylene-2",5")-5,5'-bibenzimidazole;

poly-2,2'-(naphthalene-1",6")-5,5'-bibenzimidazole;

poly-2,2'-(naphthalene-2",6")-5,5'-bibenzimidazole;

poly-2,2'-amylene-5,5'-bibenzimidazole;

poly-2,2'-octamethylene-5,5'-bibenzimidazole;

poly-2,2'-(m-phenylene)-diimidazobenzene;

poly-2,2'-cyclohexenyl-5,5'-bibenzimidazole;

poly-2,2'-(m-phenylene)-5,5'-di(benzimidazole)ether;

poly-2,2'-(m-phenylene)-5,5'-di(benzimidazole)sulfide;

poly-2,2'-(m-phenylene)-5,5'-di(benzimidazole)sulfone;

poly-2,2'-(m-phenylene)-5,5'-di(benzimidazole)methane;

poly(2,2'-(2,2'-bis(trifluoromethyl)-4,4'-biphenylene)-5,5'-bibenzimidazole);

poly-2,2"-(m-phenylene)-5,5"-di(benzimidazole)propane-2,2; and poly-ethylene-1,2-2,2"-(m-phenylene)-5,5"-dibenzimidazole)ethylene-1,2 where the double bonds of the ethylene groups are intact in the final polymer. Poly-2,2'-(m-phenylene)-5,5'-bibenzimidazole, a preferred polymer, can be prepared by the reaction of 3,3',4,4'-tetraminobiphenyl with a combination of isophthalic acid with diphenyl isophthalate or with a dialkyl isophthalate such as dimethyl isophthalate; a combination of diphenyl isophthalate and a dialkyl isophthalate such as dimethyl isophthalate; or at least one dialkyl isophthalate such as dimethyl isophthalate, as the sole dicarboxylic component.

In some embodiments, the polybenzimidazole for use in dope preparation is one from poly-2,2'-(m-phenylene)-5,5'-bibenzimidazole. The PBI dope, in one embodiment may be a solution of PBI in the range of 10 to 26 weight %, such as in the range of 13 to 23 wt %, or 16 to 20 wt %. In a particular embodiment, the polymer dope comprises 18 wt % PBI polymer.

The PBI polymer dope further comprises a dope stabilizing agent. Suitable dope stabilizing agents include inorganic salts, ionic liquids, and organic polymers. In some embodiments, the dope stabilizing agent is a lithium salt, polyvinylpyrrolidone, a polyethylene glycol, or a combination thereof. Exemplary dope stabilizing agents include lithium chloride (LiCl), lithium bromide (LiBr), lithium tetrafluoroborate ($LiBF_4$) and polyvinylpyrrolidone (PVP). In certain embodiments, the dope stabilizing agent is lithium chloride. The dope stabilizing agent concentration in PBI dope is in the range of 0.1 to 10 wt. %, such as in the range of 0.5 to 7 wt. % or 1 to 5 wt. %. In certain examples, the dope stabilizing agent concentration is 1 wt. %.

The solvents for PBI dope preparation comprises a mixture of a primary solvent A and a secondary solvent/non-solvent B. Primary solvent A comprises a polar aprotic solvent, an ionic liquid, or any combination thereof. Suitable aprotic solvents and ionic liquids include, but are not limited to, N,N-dimethylacetamide (DMAc), N-methyl-2-pyrrolidone (NMP), dimethylformamide (DMF), 1-ethyl-3-methylimidazolium acetate ([emim][Ac]) and 1-butyl-3-methylimidazolium acetate ([bmim][Ac]). In some embodiments, primary solvent A is DMAc, N-methyl-2-pyrrolidone (NMP) or 1-ethyl-3-methylimidazolium acetate ([emim][Ac]). In a particular embodiment, solvent A is DMAc. A secondary solvent/non-solvent B comprises a ketone, an organic nitrile, an alcohol, or any combination thereof. Suitable solvent/non-solvent B options include, but are not limited to, acetone (ACE), acetonitrile (ACN), methanol (MeOH), ethanol (EtOH), isopropanol (IPA) and n-propanol. In some embodiments, the weight ratio of solvent A to solvent/non-solvent B can be varied from 1 to 30. In some embodiments, solvent/non-solvent B is ACE or ACN. In a particular embodiment, solvent/non-solvent B is ACN. In one embodiment, the ratio of DMAc to ACN for dope preparation is in the range of 1 to 30, such as 2 to 8, or 2 to 4. In a particular embodiment, the ratio of DMAc to ACN is 2.35.

The bore fluid, in one embodiment, may be a mixture of one or more solvents and/or non-solvents for the polymers of the hollow fiber, wherein one type of solvent (solvent/non-solvent C) comprises a ketone, an organic nitrile, an alcohol, or any combination thereof. In some embodiments, solvent/non-solvent C comprises acetone, acetonitrile, methanol, ethanol, isopropanol, or n-propanol. In certain embodiments, solvent/non-solvent C comprises acetone (ACE) or acetonitrile (ACN). In a particular embodiment, solvent/non-solvent C is ACN. In some embodiments, the other type of solvent (solvent/non-solvent D) comprises a polar aprotic solvent, an ionic liquid, or any combination thereof. Suitable polar aprotic solvents and ionic liquids include, but are not limited to, N,N-dimethylacetamide, N-methyl-2-pyrrolidone, dimethylformamide, 1-ethyl-3-methylimidazolium acetate and 1-butyl-3-methylimidazolium acetate. In some embodiments, solvent/non-solvent D comprises dimethylacetamide, N-methyl-2-pyrrolidone or 1-ethyl-3-methylimidazolium acetate. In one embodiment, solvent/non-solvent D is N,N-dimethylacetamide.

In one embodiment, the volume ratio of solvent/non-solvent C to solvent/non-solvent D for bore fluid preparation is in the range of 15/85 to 100/0, such as 75/20 to 95/5, or 80/20 to 90/10. In a particular embodiment, the volume ratio is 85/15. In some embodiments, the bore fluid comprises acetonitrile and N,N-dimethylacetamide in a volume ratio of 15/85 to 100/0, 75/20 to 95/5, 80/20 to 90/10, or 85/15. In a particular embodiment, the bore fluid comprises acetonitrile and N,N-dimethylacetamide in a volume ratio of 85/15.

The ratio of bore flow rate to dope flow rate ratio is in the range of 0.5 to 5, such as 2 to 4. In a particular embodiment, the ratio is 3.5.

The coagulation and rinse baths comprise a mixture of one or more solvents and/or non-solvents for the PBI polymers. One type of solvent, solvent/non-solvent E comprises water, an alcohol, a ketone, an ester, an alkane, an organic nitrile, and any combinations thereof. In some embodiments, solvent/non-solvent E comprises methanol, ethanol, isopropanol, n-propanol, acetone, ethyl acetate, butyl acetate, hexanes, acetonitrile, water, or any combination thereof. In certain embodiments, solvent/non-solvent E comprises isopropanol, acetone, acetonitrile, water, or any combination thereof. Another type of solvent for coagulation and rinse baths is solvent/non-solvent F. Solvent/non-solvent F comprises a polar aprotic solvent, an ionic liquid, or any combination thereof. Suitable polar aprotic solvents and ionic liquids include, but are not limited to, N,N-dimethylacetamide, N-methyl-2-pyrrolidone, dimethylformamide, 1-ethyl-3-methylimidazolium acetate and 1-butyl-3-methylimidazolium acetate. In some embodiments, solvent/non-solvent F comprises dimethylacetamide, N-methyl-2-pyrrolidone or 1-ethyl-3-methylimidazolium acetate. In one embodiment, solvent/non-solvent F is N,N-dimethylacetamide. In a particular embodiment, the coagulation and rinse baths are water. In some embodiments, the coagulation and rinse baths have temperatures in the range 4 to 50° C., such as 10-40° C. In a particular embodiment, the coagulation and rinse baths have a temperature of 25° C.

Post treatment of the PBI hollow fiber may be performed. The post treatment may comprise supercritical drying and/or freeze drying and/or sequential solvent exchange. In some embodiments, post treatment comprises first performing sequential solvent exchange in (i) acetone, methanol, ethanol, isopropanol, or acetonitrile, and then (ii) hexane. Following solvent exchange, the PBI hollow fiber is dried before use in separation processes. Post treatment is carried out to dry the fiber without damaging the original microstructure due to surface tension and capillary forces of the imbibed residual solvent, non-solvent, coagulants or rinse liquid. Solvent exchange and subsequent drying removes residual process liquids and stabilizes the fiber structure. The term "stabilizes" means that the fiber microstructure does not degrade significantly when handled, dried, used, or stored (e.g., in ambient conditions).

To improve gas separation performance, a defect-sealing and/or protective layer may be deposited to an outer side of the PBI hollow fiber consisting of an outer integrated selective layer and a porous underlying support structure. In some embodiments, the selective layer with porous underlying support structure hollow fiber is thermally processed or cross-linked by annealing at a temperature ≥250° C., such as a temperature from 250 to 450° C. or a temperature from 300 to 450° C., prior to the sealing layer deposition. In another embodiment the defect-sealing layer 4 is deposited using standard coating techniques (e.g. spray and dip coating). The defect sealing material comprises organic materials, inorganic materials, or any combination thereof, having higher intrinsic gas permeability as compared to the native PBI hollow fiber polymer. In a particular embodiment, the defect-sealing layer is a derivative of PBI. In one embodiment, the defect sealing layer is a derivative of PBI containing bisphenyl-hexafluoropropane (6F-PBI) units wherein at least one of $R^1$ and $R^2$ in Formula 1 is:

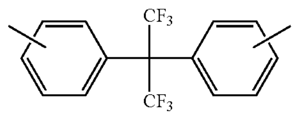

Methods of Making Carbon Molecular Sieve (CMS) Hollow Fiber Membranes

The PBI hollow fiber is then treated in a crosslinking or acid-doping step. In one embodiment, this comprises flowing a solution comprising an acid (also referred to as an acid solution) through the inbore (lumen) of the PBI hollow fiber, so that it contacts the porous support structure. This way, there is minimal penetration of the acid solution into the selective layer. The acid solution can comprise any acid known in the art. In an embodiment, the acid is capable of cross-linking nitrogen functionalities of the PBI. In an embodiment, the acid is selected from the group consisting of chlorosulphonic acid ($HClSO_3$), sulfuric acid ($H_2SO_4$), phosphoric acid ($H_3PO_4$), boric acid ($H_3BO_3$), hyposelenic acid ($H_2SeO_3$), selenic acid ($H_2SeO_4$), fluorophosphoric acid ($HF_6PF$), chromic acid ($H_2CrO_3$), citric acid ($C_6H_8O_7$), lactic acid ($C_3H_6O_6$), acetic acid ($CH_3COOH$), malic acid ($C_4H_6O_5$), tartaric acid ($C_4H_6O_6$), formic acid ($HCOOH$), oxalic acid ($C_2H_2O_4$), phthalic acid ($C_6H_4(CO_2H)_2$), oxaloacetic acid ($C_4H_4O_5$), succinic acid ($C_4H_6O_4$), hydrochloric acid ($HCl$), perchloric acid ($HClO_4$), and gluconic acid ($C_6H_{12}O_7$). In an embodiment, the acid is a monoprotic acid, such as chlorosulphonic acid, boric acid, fluorophosphoric acid, lactic acid, acetic acid, tartaric acid, hydrochloric acid, or gluconic acid. In an embodiment, the acid is a polyprotic acid, such as sulfuric acid, phosphoric acid, hyposelenic acid, selenic acid, chromic acid, citric acid, malic acid, formic acid, phthalic acid, oxaloacetic acid, or succinic acid.

In an embodiment, the acid is selected from the group consisting of phosphoric acids, carboxylic acids, and sulfuric oxoacids. In an embodiment, the acid is a phosphoric acid. In an embodiment, the acid is phosphoric acid. In an embodiment, the carboxylic acid is a monocarboxylic acid. In an embodiment, the carboxylic acid is a dicarboxylic acid. In an embodiment, the concentration of the acid is 0.03 to 10 wt %. In an embodiment, the acid solution is flowed at a rate of 0.01 to 5 mL/min. In an embodiment, this step is performed for a length of time of 2 to 200 minutes. In an embodiment, this step is performed at a temperature from 25 to 90° C.

In another embodiment, the PBI hollow fiber is soaked in an acid solution. In an embodiment, the concentration of the acid is 0.03 to 10 wt %. In an embodiment, the concentration is 0.05, 0.1, 0.2, 0.3, 0.4, 0.5, 0.6, 0.7, 0.8, 0.9, 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6, 5.8, 6.0, 6.2, 6.4, 6.6, 6.8, 7.0, 7.2, 7.4, 7.6, 7.8, 8.0, 8.2, 8.4, 8.6, 8.8, 9.0, 9.2, 9.4, 9.6, 9.8, or 10.0 wt %, or any range between two of these values.

In an embodiment, this step is performed for a length of time of 1 minute to 48 hours. In an embodiment, this step is performed for 1 minute, 5 minutes, 10 minutes, 20 minutes, 30 minutes, 40 minutes, 50 minutes, 1 hour, 2 hours, 4 hours, 8 hours, 12 hours, 16 hours, 20 hours, 24 hours, 28 hours, 32 hours, 36 hours, 40 hours, 44 hours, or 48 hours, or a range between any two of these values.

In an embodiment, this step is performed at a temperature from 25 to 90° C. In an embodiment, this step is performed at a temperature of 25, 30, 35, 40, 45, 50, 55, 60, 65, 70, 75, 80, 85, 90, or 95° C., or a range between any two of these values.

This acid-doping step may cross-link the PBI when a polyprotic acid is used, and particularly the PBI of the porous support layer. This allows for the asymmetric morphology of the PBI hollow fiber to be retained following carbonization. This acid-doping step also allows for tuning the properties of the membrane; as discussed in more detail hereinbelow, by changing the amount of acid flowing through the PBI hollow fiber (such as by changing the duration or rate of flow, or the acid concentration), the selective layer thickness may be altered.

In another embodiment, the PBI hollow fiber is soaked in a solution comprising a crosslinking agent having the formula 1,4-$C_4H_6XY$, wherein each of X and Y are selected from the group consisting of $CH_2Cl$, $CH_2Br$, and $CH_2I$. It is understood that the designation "1,4" indicates that X and Y occupy positions opposite each other ("para") on a benzene ring.

In another embodiment, the crosslinking agent has the formula

A-$R^1$-$R^2$-Z wherein $R_1$ and $R_2$ are each independently selected from alkyl having 1-20 carbons, or aryl having from 6-18 carbons, or wherein $R_1$ and $R_2$ are connected to form a ring structure having from 2-5 carbons; and wherein each of A and Z are independently selected from the group consisting of chloride, bromide, and iodide.

In another embodiment, the crosslinking agent is a p-dibromoxylene (DBX). As used herein, p-dibromoxylene may refer to the following compound:

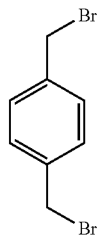

or any substituted variant thereof. The p-dibromoxylene may be substituted with $C_1$-$C_6$ alkyl, $NH_2$, $C_1$-$C_6$ alkyloxy, or halogen.

In an embodiment, the concentration of the cross-linking agent is 0.03 to 10 wt %. In an embodiment, the concentration is 0.05, 0.1, 0.2, 0.3, 0.4, 0.5, 0.6, 0.7, 0.8, 0.9, 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6, 5.8, 6.0, 6.2, 6.4, 6.6, 6.8, 7.0, 7.2, 7.4, 7.6, 7.8, 8.0, 8.2, 8.4, 8.6, 8.8, 9.0, 9.2, 9.4, 9.6, 9.8, or 10.0 wt %, or a range between any two of these values.

In an embodiment, this step is performed for a length of time of 1 minute to 48 hours. In an embodiment, this step is performed for 1 minute, 5 minutes, 10 minutes, 20 minutes, 30 minutes, 40 minutes, 50 minutes, 1 hour, 2 hours, 4 hours, 8 hours, 12 hours, 16 hours, 20 hours, 24 hours, 28 hours, 32 hours, 36 hours, 40 hours, 44 hours, or 48 hours, or a range between any two of these values.

In an embodiment, this step is performed at a temperature from 25 to 90° C. In an embodiment, this step is performed at a temperature of 25, 30, 35, 40, 45, 50, 55, 60, 65, 70, 75, 80, 85, 90, or 95° C., or a range between any two of these values.

Following the acid doping or cross-linking step, the acid-doped or cross-linked PBI hollow fiber is subjected to high-temperature carbonization (or pyrolysis), to produce PBI-derived CMS hollow fiber membranes. Any pyrolysis technique known in in the art may be used for carbonizing PBI. The pyrolysis may be performed at a temperature from 500 to 900° C. In an embodiment, the pyrolysis is performed at a temperature of 500, 550, 600, 650, 700, 750, 800, 850, or 900° C., or a range between any two of these values. The pyrolysis may be performed for a length of time of 1 second to 360 minutes. In an embodiment, the pyrolysis is performed for 1 second, 30 seconds, 1 minute, 2 minutes, 5 minutes, 10 minutes, 20 minutes, 40 minutes, 60 minutes, 90 minutes, 120 minutes, 150 minutes, 180 minutes, 210 minutes, 240 minutes, 270 minutes, 300 minutes, 330 minutes, or 360 minutes, or a range between any two of these values. The pyrolysis may be performed in flowing inert (e.g. argon, nitrogen), reactive (e.g. ammonia, steam) or vacuum atmospheres.

The exact mechanism of crosslinking depends on the crosslinking agent used. For example, using a polyprotic acid (i.e., "acid-doping") generally creates crosslinking through hydrogen bonding and proton transfer. However, other crosslinking agents may create crosslinking via covalent bonding; with DBX, as one example, the bromide groups will react with N—H groups on PBI, forming a covalent bond. Both of these mechanisms are within the scope of the term "crosslinking."

It is understood that some compounds, such as polyprotic acids, may serve as a crosslinking agent and/or an acid-doping agent; regardless of the exact mechanism of the agent's interaction with the PBI, the agent's presence in the fiber enables mitigation of the porous structure collapse during the high temperature carbonization step.

Each embodiment disclosed herein is contemplated as being applicable to each of the other disclosed embodiments. All combinations and sub-combinations of the various elements described herein are within the scope of the embodiments.

Embodiments of the invention are directed to a method of preparing a polybenzimidazole-derived carbon molecular sieve (CMS) hollow fiber membrane, said method comprising:

i) providing an asymmetric polybenzimidazole (PBI) hollow fiber membrane, said asymmetric PBI hollow fiber membrane comprising
   a) a porous support structure devoid of macrovoids;
   b) an integral porous selective layer in intimate contact with the porous support structure; and
   c) a lumen defined by the porous support structure,
ii) contacting said asymmetric PBI hollow fiber membrane with
   a) an aqueous solution comprising a crosslinking agent, thereby forming a cross-linked asymmetric PBI hollow fiber membrane, or
   b) an aqueous solution comprising an acid, thereby forming an acid-doped asymmetric PBI hollow fiber membrane; and
iii) pyrolyzing the cross-linked asymmetric PBI hollow fiber membrane or acid-doped asymmetric PBI hollow fiber membrane, thereby producing a PBI-derived CMS hollow fiber membrane.

In an embodiment, said aqueous solution comprises said crosslinking agent in a concentration of 0.03 to 10 wt %.

In an embodiment, said contacting comprises soaking said asymmetric PBI hollow fiber membrane in the aqueous solution. In an alternative embodiment, said contacting comprises flowing said aqueous solution through said lumen.

In an embodiment, said crosslinking agent is a polyprotic acid.

In an embodiment, said polyprotic acid is selected from the group consisting of phosphoric acids, carboxylic acids, and sulfuric oxoacids. In an embodiment, said polyprotic acid is a phosphoric acid.

In an embodiment, said crosslinking agent is selected from the group consisting of a) 1,4-$C_4H_6XY$, wherein each of X and Y are selected from the group consisting of $CH_2Cl$, $CH_2Br$, and $CH_2I$;
b) A-$R^1$-$R^2$-Z wherein $R_1$ and $R_2$ are each independently selected from alkyl having 1-20 carbons, or aryl having from 6-18 carbons, or wherein $R_1$ and $R_2$ are connected to form a ring structure having from 2-5 carbons; and wherein each of A and Z are independently selected from the group consisting of chloride, bromide, and iodide; and c) a p-dibromoxylene.

In an embodiment, the aqueous solution comprises a monoprotic acid.

Another embodiment is a PBI-derived CMS hollow fiber membrane made by any of the above methods.

Another embodiment is a PBI-derived, pyrolyzed CMS hollow fiber membrane comprising:

a) a crosslinked or acid-doped polybenzimidazole (PBI)-derived porous support structure devoid of macrovoids;

b) an integral PBI-derived porous selective layer in intimate contact with the porous support structure; and c) a lumen defined by the porous support structure;

wherein the PBI from which each of the porous support structure and the porous selective layer are derived is the same PBI.

In an embodiment, the porous support structure has a thickness of 10 to 1500 μm.

In an embodiment, the integral porous selective layer has a thickness of 0.01 to 250 μm.

In an embodiment, the integral porous selective layer has pores with an average diameter less than or equal to an average diameter of pores of the porous support structure.

In an embodiment, said PBI has been crosslinked with a crosslinking agent selected from the group consisting of a) a polyprotic acid;

b) 1,4-$C_4H_6XY$, wherein each of X and Y are selected from the group consisting of $CH_2Cl$, $CH_2Br$, and $CH_2I$;

c) a compound having the formula $$A\text{-}R^1\text{-}R^2\text{-}Z$$

wherein $R_1$ and $R_2$ are each independently selected from alkyl having 1-20 carbons, or aryl having from 6-18 carbons, or wherein $R_1$ and $R_2$ are connected to form a ring structure having from 2-5 carbons; and wherein each of A and Z are independently selected from the group consisting of chloride, bromide, and iodide; and d) a p-dibromoxylene.

In an embodiment, the polyprotic acid is selected from the group consisting of phosphoric acids, carboxylic acids, and sulfuric oxoacids.

In an embodiment, the membrane is acid-doped.

Another embodiment is a method for separating gases from a gas stream comprising:

i) contacting a first side of a PBI-derived CMS hollow fiber membrane as described above with a gas stream comprising two or more gases or vapors;

ii) providing a pressure or concentration gradient across the PBI-derived CMS hollow fiber membrane, so as to cause a portion of the gas stream to pass through the membrane; and iii) collecting a permeate stream at a second side of the membrane and a retentate stream at said first side of the membrane.

In an embodiment, (a) the first side of the PBI-derived CMS hollow fiber membrane is contacted with the gas at a pressure from 20 to 1000 psi;

(b) the first side of the PBI-derived CMS hollow fiber membrane is contacted with the gas at a temperature from 0 to 400° C.;

(c) a pressure or concentration gradient is provided across the PBI-derived CMS hollow fiber membrane on the second side, so as to cause a portion of the gas stream to pass through the membrane; or (d) any combination of (a), (b) and (c).

In an embodiment, the pressure gradient is created by providing a vacuum on the second side of the PBI-derived CMS hollow fiber membrane.

In general, the first side (where the feed stream contacts the membrane) would be the outside of the hollow fiber membrane, as this is where the selective layer is. The second side (where the permeate stream is collected) would be the lumen or bore side.

In an embodiment, hydrogen is preferentially transported across the PBI-derived CMS hollow fiber membrane while carbon dioxide is preferentially retained on the first side of the PBI-derived CMS hollow fiber membrane.

In an embodiment, the PBI-derived CMS hollow fiber membrane has at least one of the following:

i) a hydrogen/carbon dioxide permselectivity of at least 10;

ii) a hydrogen permeance of at least 50 GPU;

iii) an oxygen permeance of at least 20 GPU;

iv) a nitrogen permeance of at least 6 GPU; and v) an oxygen/nitrogen permselectivity of at least 6.

In an embodiment, the PBI-derived CMS hollow fiber membrane has at least or equal to one, two, three, four, or five of the properties identified by i) through v).

In an embodiment, the hydrogen/carbon dioxide permselectivity is at least or about 10, 15, 20, 25, 30, 35, 40, 45, 50, 55, 60, 65, 70, 75, 80, 85, 90, 95, 100, 110, 120, 130, 140, or 150.

In an embodiment, the hydrogen permeance is at least or about 50, 55, 60, 65, 70, 75, 80, 85, 90, 95, 100, 110, 120, 130, 140, 150, 160, 170, 180, 190, 200, 250, 300, 350, 400, 450, 500, 600, 700, 800, 900, 1000, 1100, 1200, 1300, 1400, or 1500 GPU.

In an embodiment, the oxygen permeance is at least or about 25, 30, 35, 40, 45, 50, 55, 60, 65, 70, 75, 80, 85, 90, 95, 100, 110, 120, 130, 140, 150, 160, 170, 180, 190, or 200 GPU.

In an embodiment, the nitrogen permeance is at least or about 10, 15, 20, 25, 30, 35, 40, 45, 50, 55, 60, 65, 70, 75, 80, 85, 90, 95, or 100 GPU.

In an embodiment, the oxygen/nitrogen permselectivity is at least or about 7, 8, 9, 10, 12, 14, 16, 18, 20, 22, 24, 26, 28, or 30.

In certain applications, it may be beneficial for the membrane to exhibit a low selectivity but a high permeance. In an embodiment, the hydrogen/carbon dioxide permselectivity is at most 535, and the hydrogen permeance is at least 50 GPU. In an embodiment, the hydrogen/carbon dioxide permselectivity is at most 500, 475, 450, 425, 400, 375, 350, 325, 300, 275, 250, 225, 200, 175, 150, 125, 100, 90, 80, 70, 60, 50, 40, 30, 20, or 10. In an embodiment, the hydrogen/carbon dioxide permselectivity is at most 10, and the hydrogen permeance is at least 1500 GPU.

In an embodiment, the oxygen/nitrogen permselectivity is at most 12, and the oxygen permeance is at least 50 GPU. In an embodiment, the oxygen/nitrogen permselectivity is at most 11, 10, 9, 8, 7, 6, or 5. In an embodiment, the oxygen/nitrogen permselectivity is at most 5, and the oxygen permeance is at least 200 GPU.

In an embodiment, hydrogen is preferentially transported across the PBI-derived CMS hollow fiber membrane while natural gas is preferentially retained on the first side of the PBI-derived CMS hollow fiber membrane. In a further embodiment, the PBI-derived CMS hollow fiber membrane has at least one of the following:

a) a hydrogen/natural gas permselectivity of at least 30; and b) a hydrogen permeance of at least 50 GPU;

Another embodiment is a method for separating water and an organic liquid, comprising:

i) contacting a first side of a PBI-derived CMS hollow fiber membrane as described above with a mixture comprising an organic liquid and water;

ii) providing a pressure or concentration gradient across the PBI-derived CMS hollow fiber membrane, so as to cause a portion of the mixture to pass through the membrane; and iii) collecting a permeate from the second side of the PBI-derived CMS hollow fiber membrane and collecting a retentate from the first side of the PBI-derived CMS hollow fiber membrane.

Another embodiment is a method for separating impurities and/or dissolved material from water, comprising:

i) contacting a first side of a PBI-derived CMS hollow fiber membrane as described above with a solution comprising water and impurities;

ii) providing a pressure or concentration gradient across the PBI-derived CMS hollow fiber membrane, so as to cause a portion of the solution to pass through the membrane; and iii) collecting a permeate from the second side of the PBI-derived CMS hollow fiber membrane and collecting a retentate comprising the impurities and/or dissolved material from the first side of the PBI-derived CMS hollow fiber membrane.

Discussion and Examples

The present invention provides a method for mitigating thermally induced collapse of porous support layer during carbonization, together with in-situ tailoring of the pore size distributions of the gas selective layer, thereby tailoring gas perm-selectivity.

Others have attempted to find ways to maintain asymmetric morphology of CMS precursors. U.S. Pat. Nos. 9,211,504 and 9,815,030 use vinyltrimethoxysilanes (VTMS) to treat precursor fibers prior to pyrolysis. However, these methods require well controlled fabrication conditions (e.g. high-humidity environments), and result in a thicker selective membrane than expected. Vinyltrimethoxysilanes also remain in the CMS following pyrolysis, which reduces gas throughput.

U.S. Pat. No. 10,456,747 uses p-xylylenediamine for crosslinking polyvinylidene-based dual layer asymmetric hollow fibers membranes for liquid phase separation applications including reverse osmosis, organic solvent nanofiltration and salt removal. A dual layer method is used where crosslinked PVDF is used as porous layer and a second layer comprised of PVDF or other polymer as selective layer. A dual polymer spinneret and long reaction times (e.g 10 to 96 hours) for crosslinking are drawbacks of the reported methods.

Figure 2:
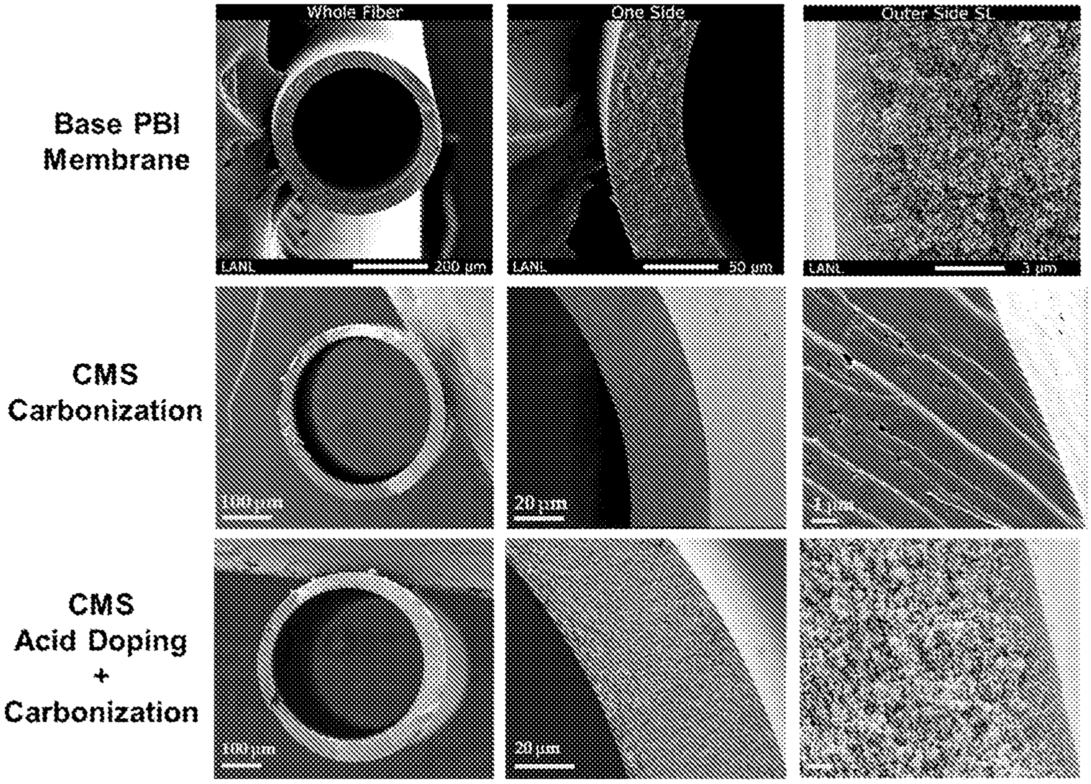
FIG. 2 shows morphology of base PBI (top row), and PBI-derived CMS (symmetric (middle row) and asymmetric, acid-doped via soaking (bottom row) morphology) hollow fiber membranes.

In this work, it was discovered that acid doping of the polybenzimidazole (PBI) hollow fiber membrane resulted in mitigating the collapse of asymmetric morphology during carbonization resulting in asymmetric CMS hollow fiber membranes (FIG. 2). For acid doping, base PBI hollow fiber membranes, post spinning, were soaked in dilute phosphoric acid solution which reacts with N-functionality on the PBI essentially crosslinking the PBI materials. The acid-doped PBI hollow fiber membranes had improved thermal characteristics and reduced chain mobility which enables mitigation of the porous structure collapse during the high temperature carbonization step. The CMS hollow fiber prepared from acid-doped PBI membranes had 1-2 orders of magnitude higher $H_2/CO_2$ selectivity (ca. 500) and industry attractive $H_2$ permeance (ca. 100 gpu) as compared to the PBI-derived CMS hollow fiber membranes that were not acid-doped.

Figure 3:
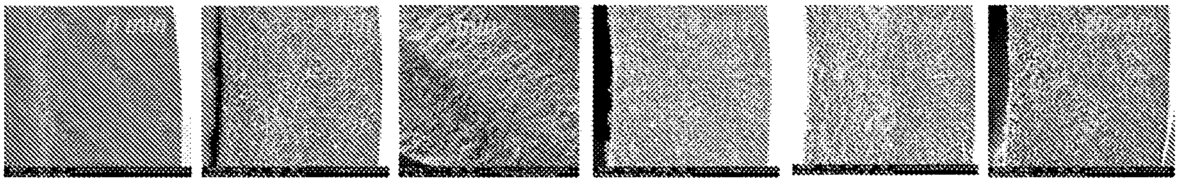
FIG. 3 shows PBI-derived CMS hollow fiber membranes fabricated using flow-through acid doping method prior to high temperature carbonization. Top row: SEM images showing membrane morphology, bottom left: acid doping conditions and separation performance data, and bottom right: variation of $H_2$ permeance and $H_2/CO_2$ selectivity measured at 250° C. as a function of reaction time.
Figure 3:
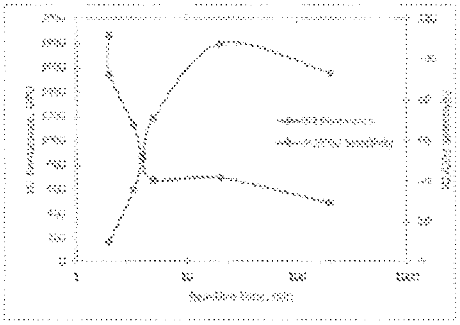

$H_2$ permeance directly controls the throughput of the separation system while high selectivity controls product purity. Prior process modeling and techno-economic studies have shown that in integrated gasification combined cycle (IGCC) process, $H_2/CO_2$ selectivity greater than 40 has diminishing returns on the process economic. Therefore, increasing $H_2$ permeance, which reduces membrane surface area, is critical to reduce membrane separation system costs. Present invention provides a method for increasing $H_2$ permeance in acid-doped PBI derived CMS hollow fiber membranes. The acid doping level of PBI base membranes can be controlled by flowing reactant solution in the inner bore (lumen) side of the base PBI hollow fiber membranes (i.e., the inside). The PBI hollow fiber membranes with controlled acid doping prepared using flow-through method produces CMS hollow fiber membranes with $H_2$ permeance and $H_2/CO_2$ selectivity pair from 500 and 93 to 1850 and 10, respectively. FIG. 3 shows the membrane fabrication conditions, along with morphology of resulting PBI-CMS hollow fiber membranes and $H_2$ separation performance measured at 250° C. in pure gases as a function of reaction time.

Figure 4:
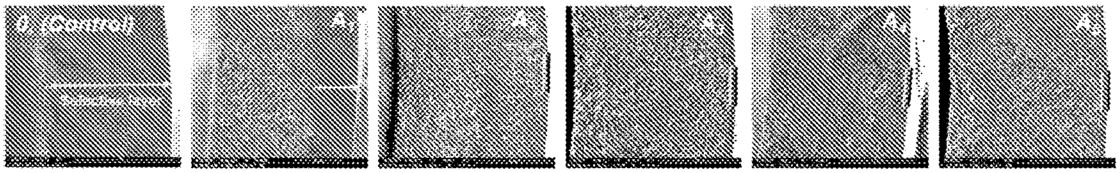
FIG. 4 shows PBI-derived CMS hollow fiber membranes fabricated using flow-through acid doping method prior to high temperature carbonization. Top row: SEM images showing membrane morphology, bottom left: acid doping conditions and separation performance data, and bottom right: variation of membrane wall thickness and $O_2$ permeance as a function of reactant concentration.
Figure 4:
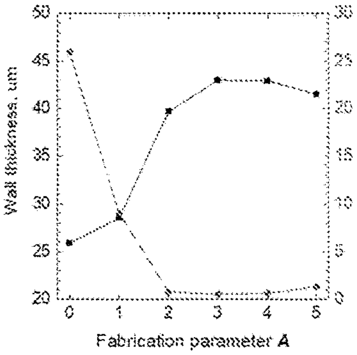
Figure 4:
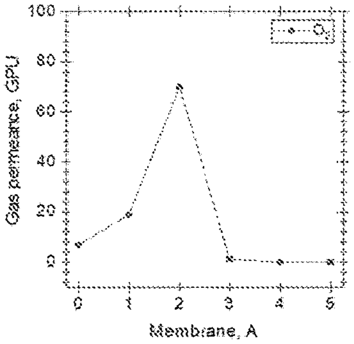

The flow through acid doping methods developed here enabled precise control in obtaining CMS hollow fibers with tunable membrane morphology. FIG. 4 shows that the selective layer thickness can be tailored between 250 to <1 μm by changing the concentration of acid solution used in PBI hollow fiber doping (FIG. 4, bottom left). The $O_2$ permeance measured at ambient temperature showed a maximum as a function of reactant concentration (FIG. 4, bottom right).

Figure 5:
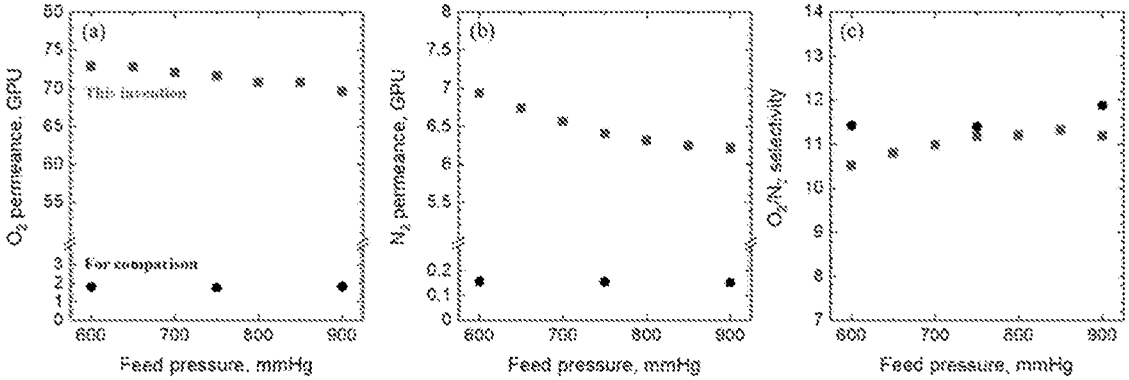
FIG. 5 shows a 40-fold increase in the $O_2$ permeance (at similar $O_2/N_2$ selectivity) achieved for acid-doped PBI-CMS hollow fiber membranes prepared using flow through method as compared to standard pristine PBI-CMS hollow fiber membranes.

FIG. 5 shows that the flow-through acid doping of PBI hollow fiber membrane prior to carbonization step disclosed here resulted in 40 fold increase in $O_2$ permeance while achieving similar $O_2/N_2$ selectivity as compared to PBI-derived CMS hollow fiber membrane prepared without acid doping step.

What is claimed:

1. A PBI-derived CMS hollow fiber membrane made by a method of preparing the polybenzimidazole-derived carbon molecular sieve (CMS) hollow fiber membrane, said method comprising:

i) providing an asymmetric polybenzimidazole (PBI) hollow fiber membrane, said asymmetric PBI hollow fiber membrane comprising a) a porous support structure devoid of macrovoids;

b) an integral porous selective layer in intimate contact with the porous support structure; and c) a lumen defined by the porous support structure, ii) contacting said asymmetric PBI hollow fiber membrane with a) an aqueous solution comprising a crosslinking agent, thereby forming a crosslinked asymmetric PBI hollow fiber membrane, or b) an aqueous solution comprising an acid, thereby forming an acid-doped asymmetric PBI hollow fiber membrane; and iii) pyrolyzing the crosslinked asymmetric PBI hollow fiber membrane or acid-doped asymmetric PBI hollow fiber membrane, thereby producing the PBI-derived CMS hollow fiber membrane.

2. A PBI-derived, pyrolyzed CMS hollow fiber membrane comprising:

a) a crosslinked or acid-doped polybenzimidazole (PBI)-derived porous support structure devoid of macrovoids;

b) an integral PBI-derived porous selective layer in intimate contact with the porous support structure; and c) a lumen defined by the porous support structure;

wherein the PBI from which each of the porous support structure and the porous selective layer are derived is the same PBI.

3. The membrane of claim 2, wherein the integral porous selective layer has pores with an average diameter less than or equal to an average diameter of pores of the porous support structure.

4. The membrane of claim 2, wherein said PBI has been crosslinked with a crosslinking agent selected from the group consisting of a) a polyprotic acid;

b) 1,4-$C_4H_6XY$, wherein each of X and Y are selected from the group consisting of $CH_2Cl$, $CH_2Br$, and $CH_2I$;

c) a compound having the formula $$A\text{-}R^1\text{-}R^2\text{-}Z$$

wherein $R_1$ and $R_2$ are each independently selected from alkyl having 1-20 carbons, or aryl having from 6-18 carbons, or wherein $R_1$ and $R_2$ are connected to form a ring structure having from 2-5 carbons; and wherein each of A and Z are independently selected from the group consisting of chloride, bromide, and iodide; and d) a p-dibromoxylene.

5. The membrane of claim 4, wherein said polyprotic acid is selected from the group consisting of phosphoric acids, carboxylic acids, and sulfuric oxoacids.

* * * * *